Patented Feb. 14, 1939

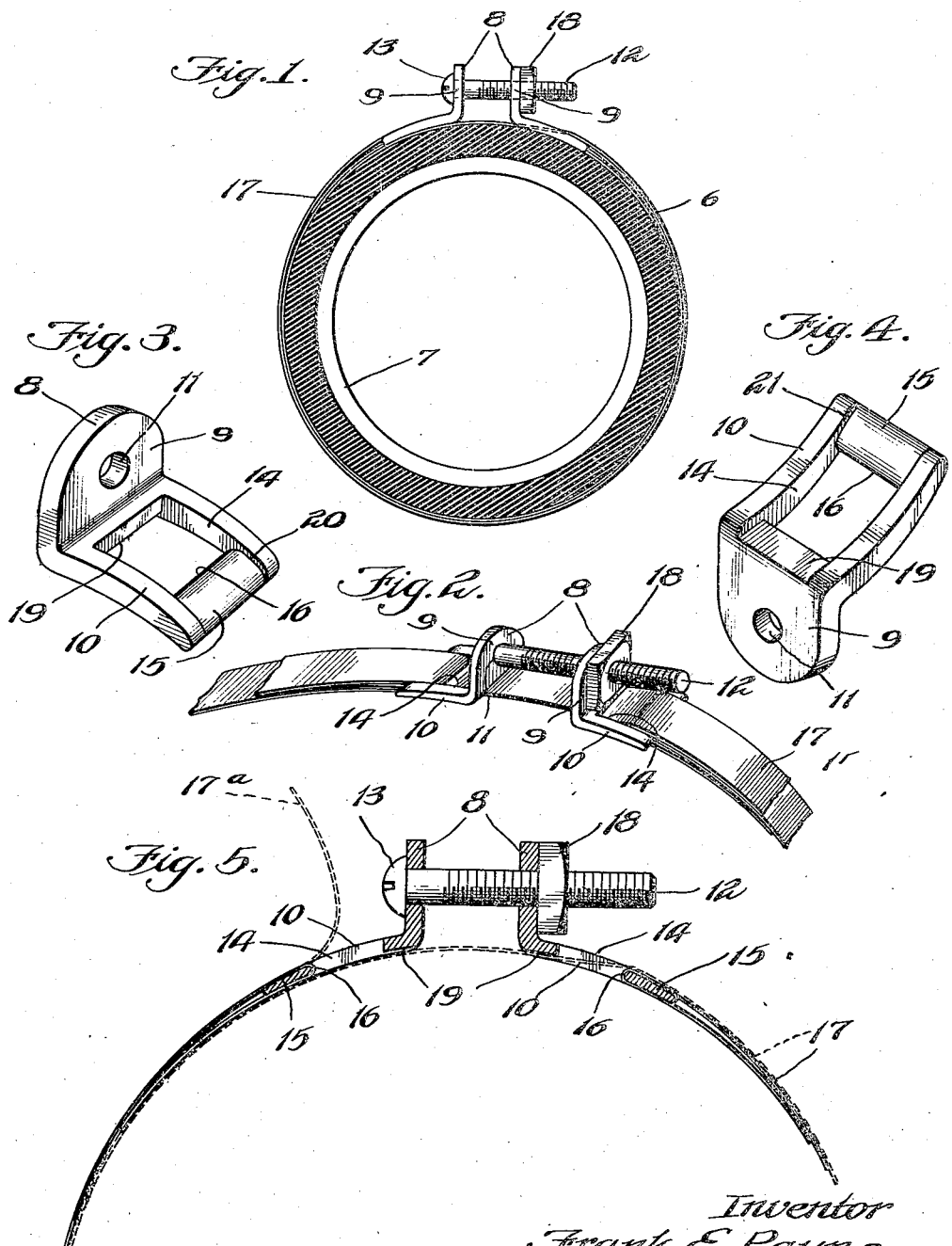

2,147,127

UNITED STATES PATENT OFFICE 2,147,127

HOSE CLAMP

Frank E. Payne, Glencoe, Ill., assignor to Crane Packing Company, Chicago, Ill., a corporation of Illinois Application January 24, 1938, Serial No. 186,633

9 Claims. (Cl. 24—19)

This invention relates in general to a clamping device for fittings of various kinds, particularly tubular fittings, for pipes of large and small diameter, and more particularly to a hose clamp for tubular pipes of various sizes.

An important object of the invention is in the provision of a readily extensible and variable clamp of this kind which may be quickly and easily adjusted to fit pipes or hose connections of different sizes.

A further object of the invention is in the provision of a clamp in which the clamping band adjustable to pipes of various sizes is doubled in thickness to provide an extremely strong and tight connection for pipes, hose connections, and the like.

A still further object of the invention is in the provision of a hose clamp having fittings adapted to provide for multiple layers of a clamping band superposed one over the other to provide a clamp of high tensile strength in which the clamping bands and fittings do not mar, disfigure or dig into the hose or other structure to which they are applied.

A still further object of the invention is in the provision of a simple clamping structure which may be readily applied to multiple bands of various lengths, the fittings for opposite sides being similar and the actual attaching means comprising a simple nut and screw which is easily and quickly applied by means of a screw driver or any similar pointed tool.

A still further object of the invention is in the provision of an encircling clamp or fitting having multiple bands adjustable for articles of different sizes in accordance with the structure as herein shown and described.

In the accompanying drawing illustrating a preferred embodiment of the invention, Fig. 1 is a sectional view of a hose connection to which a clamp in accordance with this invention is applied;

Fig. 2 is an enlarged perspective of the clamping and attachment fittings for a hose or tubular clamping band of this kind;

Fig. 3 is a perspective of one of the clamping end fittings; Fig. 4 is a perspective of a fitting invented; and Fig. 5 is a side elevation of a clamp of this kind illustrating the method of application and determination of the length of the band to be used for any particular installation.

In the ordinary hose clamps as now commonly used, sized bands are provided with a clamping device and an underlying tongue which becomes embedded in the outer layers of the hose as it is more tightly applied over a metal connecting sleeve, thus not only disfiguring and damaging the end portion of the hose but actually cutting through it at times, making a leaky connection. Furthermore these hose clamps are provided in fixed sizes which have very small variation so that the exact size must be obtained for each specific connection or the clamp is of no value.

The present invention overcomes these objections and difficulties by providing a pair of end fittings to which a flexible metal band is attached simply by bending it at the ends, by doubling the bent ends inwardly, and by making the clamp of one or more thicknesses, one overlying the other, depending upon the strength required. The metal band employed is usually of flexible steel tape which is readily bendable, is not easily broken, and if of sufficient width does not tend to damage the article to which it is applied.

Referring now more particularly to the drawing, a tubular fitting of this type is shown as applied to a fabric or other hose 6 which is clamped upon or in engagement with a metal pipe or connector 7. The clamp comprises two end fittings 8 preferably identical in form and made of stiff metal having a perforated head 9 integrally attached to a perforated body 10 extending substantially at right angles thereto, a perforation 11 in the head being unthreaded and of a size to receive and freely admit the threaded end 12 of a bolt or screw having a slotted head 13 for engagement of a screw driver. The body 10 has a rectangular perforation 14 with a marginal rim at the edges and the extremity 15 remote from the head being preferably somewhat thinner, preferably rounded at the inner edge 16 and the opposite faces of this end having recesses 20 and 21 about the width of the perforation 14 and the tape inserted therethrough. The edge under the head 9 is also provided with an undercut recess 19 to accommodate a second thickness of a binding tape 17 applied thereto so there will be no bulging due to the tape below the fitting.

The binding tape is preferably a flat steel strip of cold rolled steel which is flexible but has great tensile strength and is preferably of a width to fit loosely within the openings 14 of the clamps.

In applying this clamping band to a hose or other structure, the extremities of the band may be looped around the ends 15 of the fittings with the overlapping portions turned inwardly a considerable distance so there will be no tendency to slip or creep when tightened, and the end fittings 8 placed together with the perforated heads 9 in position to be engaged by the screw 12. A fastening nut 18 is threaded on the end of the screw and drawn up against the head of one of the fittings 8 and is of a size such that when so drawn up the nut will be held against rotation by its engagement with the angular body portion of the fitting extending from the head, thereby holding the nut against rotation, so that the screw head is easily engaged and threaded into the nut by means of a screw driver, thereby drawing up the fittings and tightly attaching the band around the hose or other article to which it is applied.

Instead of applying a band of single thickness to any hose or other article to be clamped, one end only of a length of flexible tape is looped through the end of a fitting 8 as described, the band is passed entirely around the article to be clamped, and the free extremity of the band is inserted through the opening 14 of the first end fitting as shown, the end of the band is then drawn tightly over the first layer or thickness of the band until, as shown in Fig. 5, the free extremity of the band 17 makes a second complete turn of the article. The band is then cut off to the proper length, leaving a portion 17a of sufficient length to be looped through the opposite fitting 8 and turned inwardly and under the adjacent extremity thereof so that the heads of the fittings 8 will be adjacent each other, where they are connected and the doubled band drawn up tightly by means of the nut and screw fastening device as before explained.

When the tapes are applied to the fittings, the ends are engaged by the upper and lower recesses 20 and 21 which seats the fittings, helps to keep them in place and eliminates and bulging of the tape below the fitting. When the tape is doubled for clamping, the undercut recess 19 seats the tape so that the head end of the fitting is neither raised nor the tape depressed beneath it.

With this clamp there is no pinching of the rubber hose or other material to which it is applied and no deforming of the tape under the fittings, but there is a uniform pressure toward the center all along the strip or tape. With two buckles and a fastening bolt it is thus possible either to seal a one inch tubing or a twenty-two inch pipe merely by providing a strip of the right length.

Thus a clamping band of single or double thickness is provided which may be readily applied and fastened tightly in place in any place where clamping devices of this kind may be used. They are particularly applicable for making any tubular connections such as attaching a garden hose to a pipe fitting or coupling, in attaching a radiator hose for automobile connections, in providing a grounding joint for radio connections with metal pipes, and for attaching pipe coverings. Although particularly described for use in connection with circular pipes or attachments it is also apparent that a clamping band of this kind may be attached in single or double thicknesses about any suitable articles or materials.

I claim:

1. In a clamp comprising a free strip of metal of sufficient length to extend twice around an article, similar fittings for each end of the strip, each fitting having an apertured end through which a strap end is inserted and the free end folded under to form a loop, the metal strip inserted intermediate its ends through the aperture of one fitting, the under side of each fitting having a recess of a depth to seat the strip therein, and clamping means for drawing the fittings together in tightening the strip.

2. In a circular clamp, a pair of end fittings each having a perforated head portion and a perforated body extending at an angle thereto, fastening screw means for clamping the head portions of the fittings together, and a metal strip having a loop at each end adapted to engage the perforation of the body and the intermediate portion also extending through the body perforation of one fitting to provide a double thickness with one strand overlying the other and the underside of each fitting having a recess of a depth to seat two thicknesses of the strip therein.

3. In a clamping band, a pair of end fittings each having an apertured body and a clamping head at an angle thereto, a metal strip to extend through one body aperture and a loop at each end to engage one of the fittings, the strip thus lying in coils one over the other about an article to be clamped, the under-side of each fitting having a recess to seat two strips at one end and one strip at the other, and means for drawing the clamping heads together.

4. In a clamping band, a pair of end fittings each having a body with a rectangular aperture and a clamping head at an angle thereto and an undercut recess the width of the aperture below the head, a metal strip having a double coil with one strand extending through the aperture and seated in the recess, and with end loops each engaging the rectangular aperture of one fitting, the recess at one end of the aperture seating one thickness and at the other end two thicknesses of the strip, and clamping means to draw the heads of the fittings together.

5. In a circular clamp, a pair of end fittings each having a body with a rectangular aperture and a clamping head at one end at an angle thereto, the opposite end of the body having a cross piece recessed at top and bottom with a rounded edge at the inner side of the aperture, a metal strip of a width to extend closely through the aperture and seated in the recesses of the cross piece with a loop at each end to engage flatly against the rounded edge of one of the fittings, and means to draw the clamping heads together to tighten the strip.

6. In a circular clamp, a pair of end fittings each having a body with an aperture and a head extending at an angle at one end of the body, a clamping strip of a width to extend through the aperture and having a loop at each end engaging the end of a fitting opposite the head, said end being recessed above and below to seat the loop of a clamping strip, the heads being perforated, a fastening screw inserted through the perforations of opposite heads, and a fastening nut threaded upon the screw and of a size to seat against one head with its side edge against the body of that fitting to prevent the nut from turning as the screw is turned.

7. A clamp comprising a metal strip, a pair of end fittings, each having an apertured body with a perforated head at an angle at one end, one end of each end of the strip being inserted through the aperture of the body and turned reversely at the inside to provide a loop engaging the end of the body, the end of the body being recessed at upper and lower sides thereof to seat the said loop and the lower side recess being deep enough to seat an additional thickness of the strip, and means to draw the heads together tightening the strip.

8. In a clamp, a pair of fittings each having a perforated head with an apertured body extending at an angle therefrom, a flat metal strip of a width to fit in the aperture having a loop at the end to engage the end of the body, the under face of the body having a recess at each end of its aperture of a depth to seat the strip therein at one end and of a depth for a plurality of strips at the other end, and means to engage and draw the heads together.

9. In a clamp according to claim 8, the fitting body aperture providing an opening for wrapping the strip more than one turn around an article to be clamped, the end of the fitting below the head having a recess at the end of the body to receive and seat the wrapped portion of the strip only therein.

FRANK E. PAYNE.